United States Patent

Lemouzy

[15] 3,657,662

[45] Apr. 18, 1972

[54] ELECTRONIC APPARATUS FOR CONVERTING IMPEDANCES AND ELECTRICAL MEASUREMENTS

[72] Inventor: Joseph Antoine Lemouzy, 32 Boulevard de la Bastille, Paris 12, France

[22] Filed: July 18, 1969

[21] Appl. No.: 843,083

[30] Foreign Application Priority Data

July 30, 1968 France ....................161091

[52] U.S. Cl. ....................330/17, 330/28, 330/30 D, 330/35

[51] Int. Cl. ....................H03f 3/18

[58] Field of Search ....................330/28, 30, 30 D, 35, 69, 13, 330/17

[56] References Cited

UNITED STATES PATENTS

| | | | |
|---|---|---|---|
| 2,716,162 | 8/1955 | Pearlman | 330/108 X |
| 3,042,876 | 7/1962 | Pegram | 330/30 UX |
| 3,077,566 | 2/1963 | Vosteen | 330/30 UX |
| 3,287,653 | 11/1966 | Goordman | 330/30 UX |
| 3,395,359 | 7/1968 | Zachev | 330/30 |
| 3,474,347 | 10/1969 | Praglin et al. | 330/35 X |
| 3,530,395 | 9/1970 | Prusha | 330/30 D X |

FOREIGN PATENTS OR APPLICATIONS

| | | | |
|---|---|---|---|
| 6,500,575 | 7/1965 | Netherlands | 330/30 |

*Primary Examiner*—Roy Lake
*Assistant Examiner*—James B. Mullins
*Attorney*—Breintenfeld & Levine

[57] ABSTRACT

This specification discloses an electronic apparatus of the tripole type for converting impedances. A transistorized differential symmetrical amplifier comprises first and second identical half-amplifiers which both have high input impedance and low output impedance.

A negative feedback connection exists between the input and output of the first half-amplifier. A tripole is formed by three connecting terminals connected respectively to the feedback connection, the input of the second half-amplifier, and the output of the second half-amplifier.

Substantially zero impedance exists at an output between the first and third terminals and at an input between the first and second terminals, and an extremely high impedance is present between the second and third terminals, when the second and third terminals are connected by a non-infinite impedance.

7 Claims, 6 Drawing Figures

INVENTOR:
JOSEPH A. LEMOUZY
By
Breitenfeld & Levine
ATTORNEYS

INVENTOR:
JOSEPH A. LEMOUZY
By
Breitenfeld & Levine
ATTORNEYS

INVENTOR.
JOSEPH A. LEMOUZY

ELECTRONIC APPARATUS FOR CONVERTING IMPEDANCES AND ELECTRICAL MEASUREMENTS

The present invention is concerned with an electronic apparatus for the conversion of impedances and the measurement of electric currents and voltages, and more generally of all electrical or other values which are capable of being converted into electric currents or voltages.

It is known that the major problem in connection with the measurement of voltages and currents consists in that the internal impedance of the measuring apparatus disturbs the value which is to be measured. In an ideal case, an apparatus for the measurement of voltages should have an infinite internal impedance, and an apparatus for the measurement of currents should have a zero internal impedance. Such impedances are incompatible with the conventional measuring instruments, whether or not preceded by amplifiers.

The present invention thus proposes to provide an arrangement having an internal impedance which is extremely high and only limited by the quality of the insulations which can be used (more than $10^{14}$ ohms) on its input terminals for the measurement of voltages, and having an internal impedance which is extremely low and only limited by the resistance of the electrical connections on its input terminals for the measurement of currents, the said arrangement having output terminals which can be connected to an indicating or recording instrument so as to be used for the measurement of voltages or currents.

It is further proposed according to the present invention to provide an arrangement permitting the apparent internal resistance of a voltage source to be considerably lowered and the apparent internal resistance of a current source to be considerably raised, that is to say, it becomes possible to effect conversions of impedances, the quality of which is such that it is possible in a simple manner to provide condenser-type memories and integrators, condenser-type combined attenuators and dividers for direct current, and other similar arrangements which are known in theory but which cannot be carried into effect in the absence of extremely small or extremely high impedances.

It is further proposed according to the invention to provide an arrangement having the aforementioned impedances on its input terminals and comprising an incorporated indicating instrument, for example, a galvanometer, for measuring voltages or currents, or measurements derived from the foregoing.

It is also proposed according to the invention to provide an arrangement having the aforementioned impedances on its input terminals, and comprising an incorporated amplifier permitting the operation of a recorder of conventional type for measuring voltages or currents, the gain of the said amplifier being advantageously controlled in such a way that it is sufficient for a single sensitivity range on the recorder to correspond to all the sensitivity ranges of the arrangement.

The aforementioned objects of the invention, and also other objects which will hereinafter be explained, are essentially achieved by using a differential symmetrical amplifier, of which the gain has a value of one because of a practically complete negative feedback.

According to the invention, the two identical halves of the aforesaid differential symmetrical amplifier, hereafter denoted as the two half amplifiers, each have a negative feedback loop. On one of these half-amplifiers, the negative feedback is total through this loop, that is to say, an internal connection connects its output to its input, and thus to a first terminal intended for the external connections to the arrangement. On the other of these half-amplifiers, the negative feedback from its output to its input is made across two terminals, denoted as a second terminal connected to the input of the half-amplifier and a third terminal connected to the output of the half-amplifier.

This particular assembly of the differential symmetrical amplifier thus comprises three terminals and hence the name of "tripole," by which it will be hereinafter referred to.

Each half-amplifier comprises a plurality of transistorized amplification stages, providing a high gain with reversal of voltage, namely, an input stage at high impedance, an output stage at low impedance and two intermediate stages. The input stage preferably comprises a field-effect transistor of the type wherein control electrode is isolated by semi-conducting junction effect or of the insulated grid type (e.g., MOS). The output stage comprises a power transistor, having a load resistance connected in series with its emitter, or a transistor assembly equivalent to a power transistor, for example of the "-Darlington" type.

In addition, the corresponding intermediate stages, i.e., having the same rank or degree of the two half-amplifiers are connected to one another by using an emitter resistance common to the transistors of the said corresponding intermediate stages, so as to produce a total negative feedback between the corresponding stages of said half-amplifiers. It is also advantageous to provide, between the various intermediate stages of the half-amplifiers, connections with a time constant, judiciously positioned to avoid any auto-oscillation of the assembly.

The way in which the invention can be carried into effect will be best understood from the following description and the accompanying drawings, given as non-limiting examples.

Figure 3:
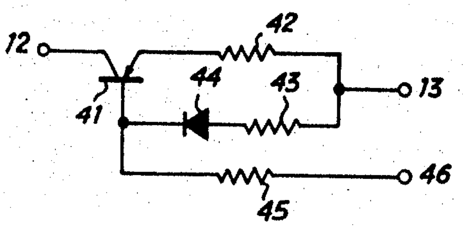
Figure 4:
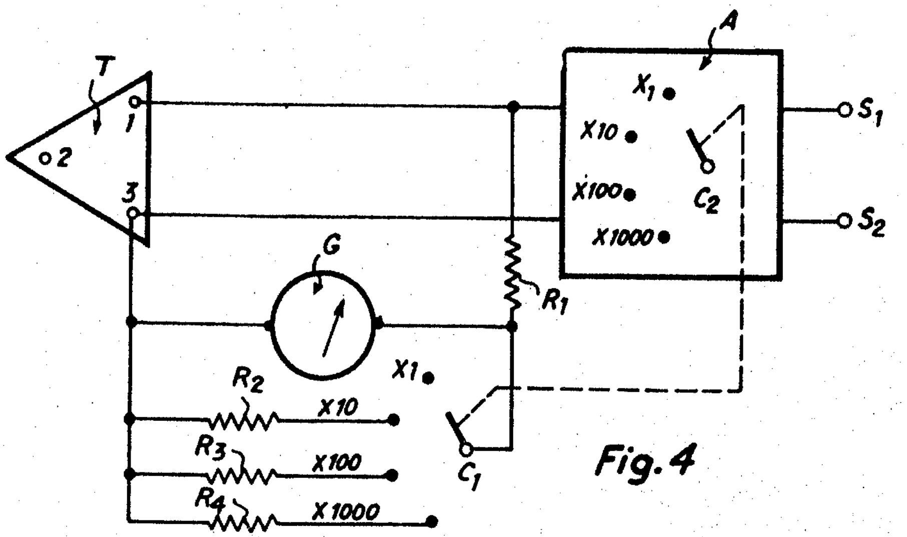
Figure 2:
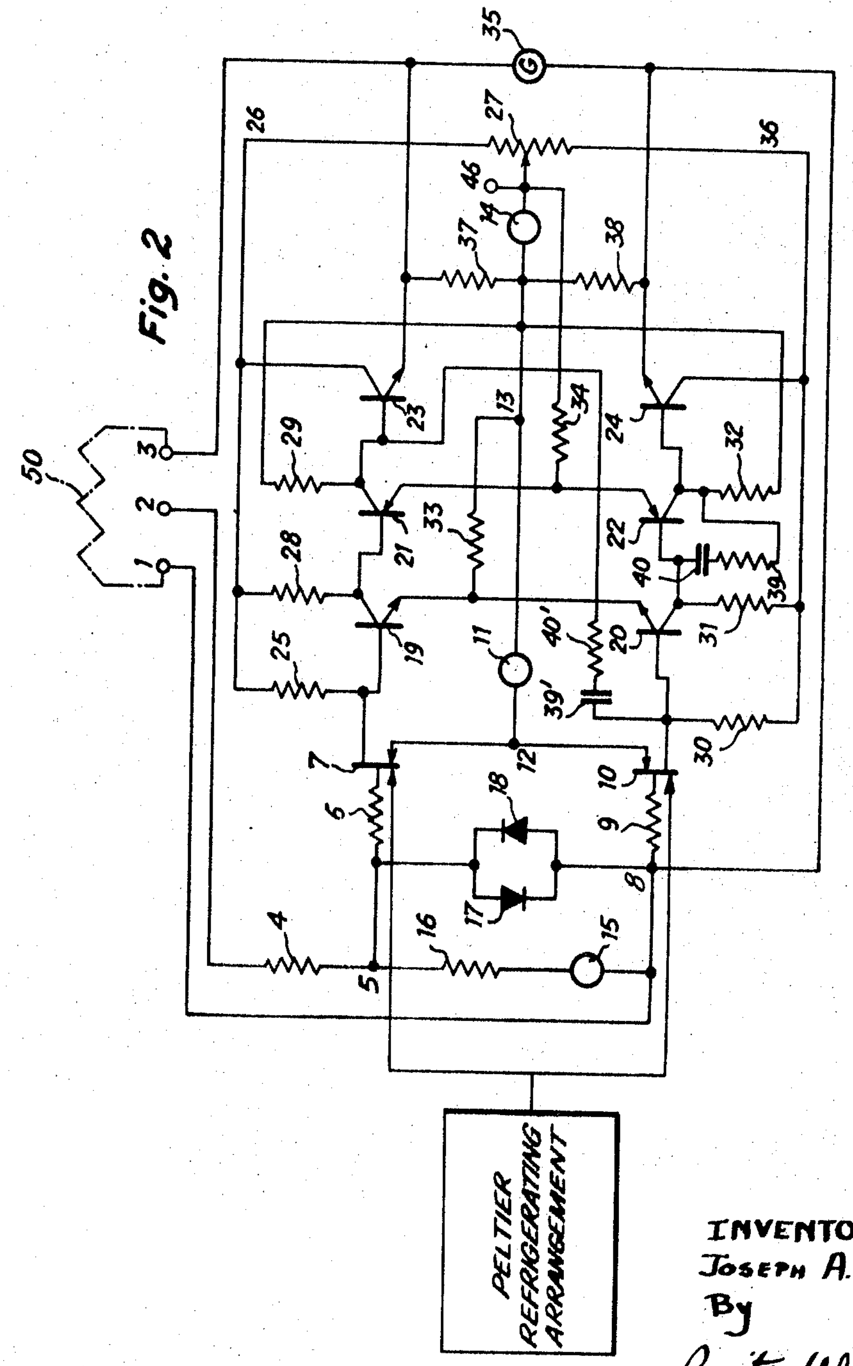
FIG. 2 represents the diagram of a preferred embodiment of the tripole of FIG. 1.
Figure 5:
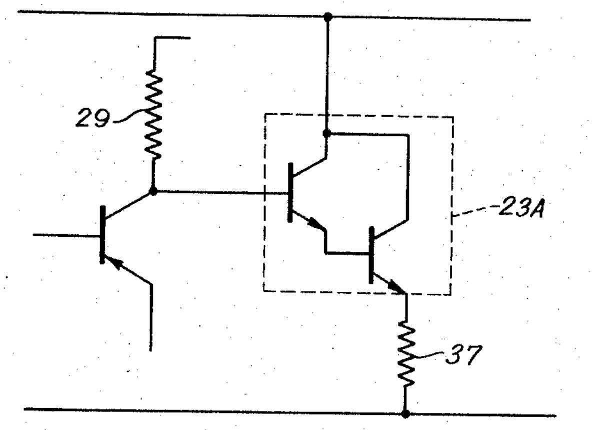
Figure 6:
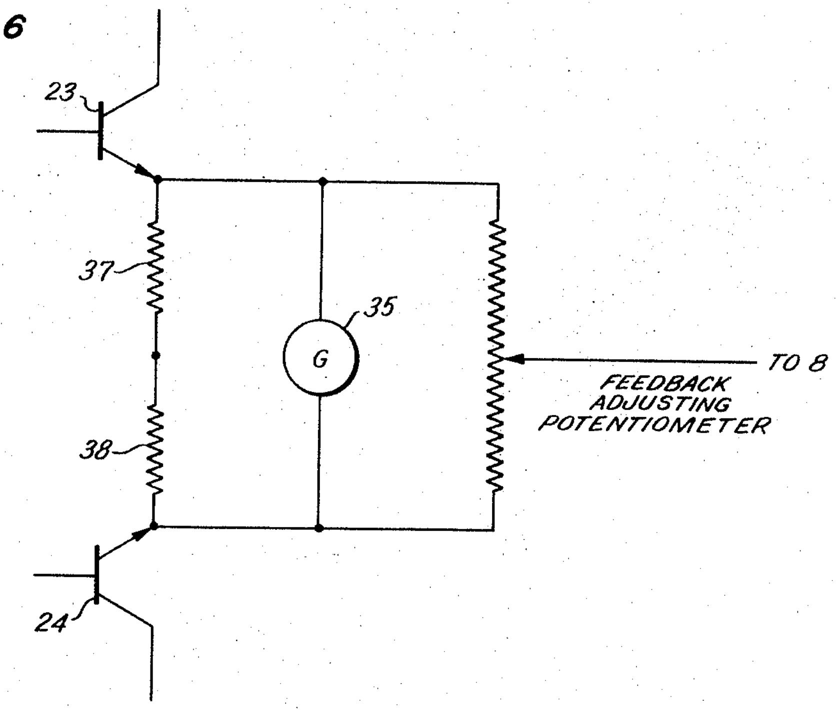

FIG. 3 represents diagrammatically one advantageous embodiment of a direct current source incorporated in the diagram of FIG. 2; and FIG. 4 shows diagrammatically an arrangement according to the invention, comprising a tripole associated with an amplifier which is such that the output signal of the arrangement develops in a single sensitivity range, FIG. 5 represents diagrammatically a "Darlington circuit"; and FIG. 6 represents diagrammatically an adjustable negative feedback arrangement.

Figure 1:
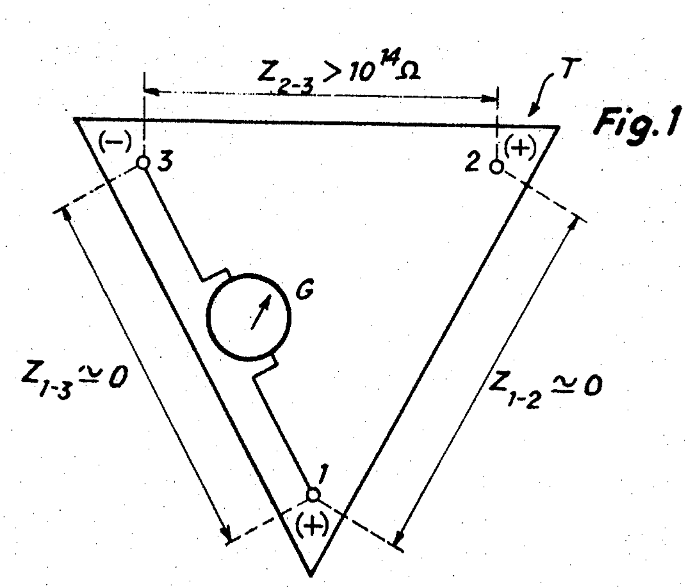
FIG. 1 represents diagrammatically the tripole according to the invention and the impedances which characterize it.

In all these Figures, similar elements are given the same references. Referring more particularly to FIG. 1:

The tripole indicated generally by T comprises three terminals indicated at 1, 2, and 3. This tripole is characterized by the value of the internal impedances between its terminals taken in pairs: more than $10^{14}$ ohms between the terminals 2 and 3 (impedance indicated by $Z_{2-3}$); practically zero between the terminals 1 and 2 (impedance indicated by $Z_{1-2}$) and practically zero between the terminals 1 and 3 (impedance indicated by $Z_{1-3}$). In addition:

The tripole according to the invention has essentially gain of 1 for an input voltage applied between the terminals 2 and 3 with respect to an output voltage collected between the terminals 1 and 3: the insertion of such a tripole after a voltage source thus provides a considerable lowering of the impedance under which this voltage is available, without modifying the value of this voltage.

Furthermore, the tripole according to the invention has essentially gain of one for a current injected between the terminals 1 and 2 in relation to a current collected between the terminals 2 and 3: the insertion of such a tripole after a current source thus provides a considerable raising of the impedance under which this current is available, without modifying the value of this current.

It is apparent from the preceding properties that the tripole can be used as a current amplifier: actually, if a resistance R is connected between the terminals 2 and 3 and a current source injects a current $i$ between the terminals 1 and 2, a current of equal value $i$ is injected by the tripole into the resistance R, at the terminals of which then appears the voltage $V=R\cdot i$, which the tripole also causes to appear between the terminals 1 and 3; assuming that a receiving device having an input resistance $R'$ is connected between these terminals 1 and 3, a current $i'=V/R=(R\cdot i)/R'=i\cdot(R/R')$ flows through this device the current supplied by the source has been amplified by the tripole in the ratio $R/R'$ before being supplied to the receiver.

By replacing the aforesaid resistance R by a condenser C, an integrator is obtained: for a current *i* injected between the terminals 1 and 2, a current of equal value is supplied by the tripole at its terminals 2 and 3 for charging the condenser: the voltage $$\int_0^t C \cdot i \cdot dt$$

at the terminals of the condenser is carried by the tripole to the terminals 1 and 3, where this voltage can be applied to a receiver without upsetting the charge of the condenser and thus without error in measurement.

The aforesaid receiver can with advantage be a galvanometer G connected between the terminals 1 and 3 for indicating the voltage between these terminals; the presence of this galvanometer does not modify the aforesaid properties of the terminals 1, 2, and 3, because of the practically zero impedance between these terminals, and 3; for this last reason, it is moreover possible to connect any receiver between the terminals 1 and 3, such as an amplifier or recorder, the functioning of which does not interfere with the presence of the galvanometer G.

Referring now more particularly to FIG. 2, the terminals of the tripole are to be seen at 1, 2, and 3. The terminal 2 is connected through a resistance of high value 4 to a point 5, which is itself connected through a high resistance 6 to the control electrode of a first input transistor 7. The terminal 3 is connected to the emitter of a first output transistor 23. The terminal 1 is directly connected to a point 8, which is connected firstly through a high resistance 9 to the base of a second input transistor 10 identical with the transistor 7 and secondly to the emitter of a second output transistor 24 identical with the transistor 23. The galvanometer G of FIG. 1 is represented at 35, and it is connected on one side to the terminal 3 and to the emitter of the output transistor 23, and on the other side to the terminal 1 (by means of the point 8) and to the emitter of the output transistor 24.

Respectively situated between the input transistors 7 and 10 and the output transistors 23 and 24 are two intermediate stages, whereby are formed two four-stage half-amplifiers, of which the gain in an open loop is as high as possible, for example, from 10,000 to 50,000 and in any case at least of the order of 1,000.

For this purpose, and in order to obtain an input impedance which is as high as possible, the input transistors 7 and 10 are of the FET or MOS FET type; these transistors comprise a control electrode, a source electrode and a drain electrode. The two source electrodes of the transistors 7 and 10 are connected to one another and also to the point 12, which latter is connected to one of the terminals of a constant current source 11, having another terminal connected to the junction 13: this coupling between the two input transistors provides a negative feedback effect between the input stages of the two half-amplifiers. In order to avoid the two input transistors 7 and 10 being damaged by the inopportune application of a high voltage between the terminals 2 and 3, the high resistance 4 is interposed between the terminal 2 and the control electrode of the input transistor 7. In addition, two diodes 17 and 18 of very high impedance are connected head-to-tail between the points 5 and 8, that is to say, between points which are normally at the same potential, since the impedance of the tripole between the terminals 1 and 2 is practically zero; the diodes 17 and 18 are normally not conducting and do not lower the impedance of the tripole between the terminals 2 and 3, but nevertheless their presence associated with that of the resistance 4 and resistances 6 and 9 mounted respectively in series with the control electrodes of the input transistors 7 and 10 permits accidental overvoltages to be avoided on the control electrodes.

A means is provided for compensating for the current of the control electrode of the input transistors 7 and 10, in order thus to eliminate the undesired voltage which is caused to appear by this current between the terminals 2 and 3 of the tripole. The said means comprises an adjustable current source 15 in series with a resistance 16, the assembly being connected between the points 5 and 8.

As mentioned above, the transistors 7 and 10 form the input stages of a four-stage symmetrical amplifier. The second stages of this amplifier are formed by two transistors 19 and 20 of the NPN-type, while the third stages are formed by two transistors 21 and 22 of the PNP-type. Finally, as already indicated, the fourth stage is formed by two transistors 23 and 24 of the PNP-type, using the circuit known as "emitter follower." As a modification, if a high output power is desired, each of the output transistors 23 and 24 can be replaced by a circuit 23A (FIG. 5) having a plurality of continuous coupling transistors, known under the name of "Darlington circuit."

The connection between the stages of the amplifier is obtained in conventional manner. The drain electrode of the transistor 7 is directly connected to the base of the transistor 19, and also through a charging resistance 25 to a conductor 26. This latter is connected to one of the ends of a potentiometer 27, of which the slider is connected to one of the terminals or poles of a voltage source 14. The other pole of the voltage source 14 is connected to the point 13. In addition, the collector of the transistor 19 is connected to the base of the transistor 21 and also through a charging resistance 28 to the same conductor 26. Finally, the collector of the transistor 21 is connected to the base of the transistor 23, and also to the point 13 through a charging resistance 29. The connections of the transistors 10, 20, 22, and 24 are assured in symmetrical manner by means of resistances 30, 31, and 32, as well as a conductor 36 connected to the other end of the potentiometer 27. The emitters of the transistors 19 and 20 are connected to one another and also to the point 13 through a common resistor 33, this coupling supplying a negative feedback effect between the second stages of the two half-amplifiers; the emitters of the transistors 21 and 22 are likewise connected to one another and also to the slider of the potentiometer 27 through a polarisation resistance 34. Finally, the circuit of the output transistors 23 and 24 is as follows: the collectors of these transistors are either respectively connected to the conductors 26 and 36, in the manner shown in FIG. 2, or as a modification, these collectors are directly connected to the slider of the potentiometer 27; the emitters of these transistors are connected to the point 13 through the respective charging resistances 37 and 38.

Finally, with a view to avoiding the production of undesirable oscillations due to the very high gain of the open loop amplifier, it is advantageous for one or more resistance and capacitor phase shifter circuits to be appropriately arranged between the stages of the amplifier. Two phase shifters are shown in FIG. 2: the first, comprising the resistance 39 in series with the condenser 40, is disposed between the base and the collector of the transistor 22; a second, comprising the resistance 39' in series with the condenser 40', is disposed between the base of the output transistor 23 and the base of the transistor 20, that is to say, this arrangement forms a connection with shift of phase between the two half-amplifiers.

The adjustment of the slider of the potentiometer 27 permits the amplifier to be balanced, that is to say, to obtain a "zero" reading on the galvanometer G when the terminals 2 and 3 are short-circuited.

In such an arrangement, the negative feedback is complete because of the connections between the corresponding electrodes of the transistors 7 and 10, 19 and 20, 21 and 22, and because of the connections between the output and the input of one of the half-amplifiers (the effect of the resistances 4, 6, and 9 is negligible in view of the impedance of the control electrode of the input transistors).

When the terminals 2 and 3 are connected by a non-infinite impedance 50, no voltage can appear between the points 5 and 8 or even between the terminals 1 and 2; this is equivalent to saying that the impedance is zero between the terminals 1 and 2 of the tripole. In addition, any voltage applied between the terminals 2 and 3 causes appearance of a voltage equal in absolute value but opposite in sign between the emitters of the output transistors, or even between the terminals 1 and 3, so that the sum of the two aforesaid voltages is zero between the terminals where this sum appears, that is to say, precisely between the terminals 1 and 2. In the circuit which would be able to carry a current between the terminals 2 and 3, this circuit comprising the points 5 and 8 and the galvanometer 35, a voltage appears at the terminals of the galvanometer 35 which is opposite to the voltage applied between the terminals 2 and 3, and consequently no current is circulating in this circuit, because the total voltage is zero: this is equivalent to saying that a voltage generator applying a voltage between the terminals 2 and 3 finds between these terminals an infinite impedance on the tripole.

One modified embodiment of this arrangement permits a gain higher than one to be obtained in the tripole and a voltage higher than the voltage applied between the terminals 2 and 3 to be obtained between the terminals 1 and 3: it is sufficient for this purpose to provide a potentiometer connected at its ends between the emitters of the output transistors 23 and 24 and to connect the point 8 to the slider of this potentiometer instead of the emitter of transistor 24 (FIG. 6). The movement of the slider of the potentiometer permits the amount of negative feedback to be regulated between 0 and 100 percent and thus for the gain of the tripole to be regulated to a value equal to or greater than one.

FIG. 3 shows one advantageous embodiment of the constant current source 11 shown in FIG. 2. This source is formed by a transistor 41, of which the collector is connected to the point 12 and the emitter to the point 13 by means of a resistance 42. The base of the transistor 41 is connected to the point 13 by means of a diode 44 in series with a resistance 43, the diode being conductive from the point 13 towards the base of the transistor 41. This base is further connected by the resistance 45 to the point 46, which corresponds to the pole of the voltage source 14 and to the slider of the potentiometer 27.

As already described by reference to FIG. 2, an adjustable current source 15 and a resistance 16 are provided for compensating for the current of the control electrode of the input transistors, and more precisely the difference between the currents of each of these two transistors. It is necessary to regulate this current source 15 each time the apparatus is brought into use and to modify this adjustment from time to time, so as to take into account variations in the operating temperature of the apparatus and the ambient temperature, mainly when it is desired to measure currents in the ranges of $10^{-12}$ to $10^{-15}$ amperes. It is possible to overcome this dependence according to the invention, by arranging for a Peltier effect cooling system to be brought into thermal contact with each of the two input transistors of the tripole, so as to stabilise the temperature of these transistors to a value which is lower than ambient temperature, for example, lower than 10° C. Such arrangements are described in H. J. Goldsmid, Applications of Thermoelectricity, London 1960, Methuen and Co. Ltd., and DKC Mac Donald, An Introduction to the Principles of Thermoelectricity, New York 1962, John Wiley.

It is a surprising fact that the thermal stabilization of the input transistors at a relatively low temperature makes possible a simplification of the construction of the arrangement and its adjustment. In actual fact, not only is the input current of the transistors stabilised, but in addition this current is appreciably reduced, from the order of magnitude of $5.10^{-13}$ amperes to the order of $10^{-15}$ amperes. Obviously, the difference between the input currents of the two input transistors of the tripole is reduced accordingly, and under these conditions, it becomes possible to eliminate the auxiliary current source 15 and its resistance 16; on account of the stability and the low value of the difference in the currents to be compensated for, a standard adjustment can be provided at the time the apparatus is constructed, and the user no longer has to effect a compensating adjustment for the variation in input current.

It is to be noted that the aforesaid result would not be achieved by the usual processes of thermal stabilisation of the transistors, consisting in heating the transistors to a stabilised temperature above 60° C, in order to protect them from the variations in the ambient temperature and to avoid the drift upon cut-off. Actually, such a stabilization method has the effect of increasing the input currents of the transistors in question, and does not provide the aforesaid advantages produced by the stabilization method according to the invention.

The aforesaid result would also not be achieved by a known method of refrigeration with liquid nitrogen or liquid helium, such as used in the parametric amplifiers, since at the low temperatures thus attained, the operation of the transistors used at the input of the arrangement ceases to be satisfactory, because of modifications in the electronic characteristics of the semiconductors forming these transistors.

In a likewise surprising manner, the thermal stabilisation of the input transistors of the tripole according to the invention permits the connection between the tripole and a recording device for the output voltage of the tripole to be improved. It is in fact desirable to be able to position a recording arrangement in parallel with the galvanometer G of the tripole so as to record without any measurement error the voltage applied to the terminals 2 and 3 of the tripole: the tripole then has the function of transforming impedances for continuous signals, permitting the use of a recording unit of conventional type, of which the input impedance is not very high. In the absence of precautionary measures, this association of a tripole and a recording unit is however affected by two types of disadvantages.

Firstly, the tripole functions correct in a large range of applied voltage, extending from less than 100 microvolts to more than 10 volts, whereas for such a voltage range, the galvanometers and recording units must undergo several changes in scale in order to be kept within the best conditions as regards precision and sensitivity; the association of a tripole and a recording unit does not use to the best possible degree the possibilities offered by each of these arrangements, taken separately.

Secondly, the association of a recording unit and a tripole necessitates a complete and permanent correction of the drift of the characteristics of the tripole, which can reach an order of magnitude of one or several microvolts per hour, this drift essentially producing variations in the temperature of the apparatus and being shown more particularly when the latter is brought into service. The continuous functioning of a recording unit does not in fact permit making the calibration of the "zero" of a tripole as frequently as when discrete measurements are made by reading the galvanometer.

The thermal stabilization of the input transistors of the tripole according to the invention provides a solution to these disadvantages; it does in fact become possible to amplify the output voltage of the tripole before it is applied to a recording unit, since the drift voltage, suppressed by the thermal stabilization, is no longer amplified as stray voltage simultaneously with the desired voltage. Consequently, provision is made according to the invention to add to the tripole an amplifier of the operational type in order to multiply by a constant coefficient the output voltage of the tripole. The gain of this amplifier is preferably adjustable to a certain number of fixed values, for example, 1, 10, 100, 1000. It is also preferable for the switching of the gain of this amplifier to be effected by the same operation as the switching of the sensitivities of the galvanometer G associated with the tripole, so that the galvanometer and any recording or indicating instrument connected to the output of the amplifier give indications developing simultaneously between 0 and 100 percent of their respective scale.

FIG. 4 represents diagrammatically one embodiment of an arrangement comprising a tripole, of which the deviation or drift is eliminated by temperature stabilisation and an amplifier. Shown in this Figure is a tripole T, a galvanometer G, the function of which is equivalent to that of the galvanometer 35 of FIG. 2, an operational amplifier A and two mechanically coupled contactors $C_1$ and $C_2$. The outputs 1 and 3 of the tripole simultaneously feed the galvanometer G and the amplifier A. In known manner, the sensitivity range of the galvanometer G is adjustable by means of resistances $R_1$, $R_2$, $R_3$, and $R_4$ and the contactor $C_1$: the aforementioned resistances are chosen, in the example illustrated, so as to obtain the attenuations X1, X10, X100 and X1,000 of the deviation of the galvanometer. According to the invention, the amplifier A has an adjustment in gain which can be switched by the contactor $C_2$ and having the same attenuation ratios as the adjustment in sensitivity of the galvanometer G. Under these conditions, the available voltage between the terminals $S_1$ and $S_2$ is in a single sensitivity range: no adjustment of sensitivity is necessary on an arrangement connected to the terminals $S_1$ and $S_2$, for example, a recording unit, when the voltage applied between the input terminals 2 and 3 of the tripole varies between wide limits, if the operator takes care that the galvanometer is switched to the suitable sensitivity range. Thus, the range of output voltages on the terminals $S_1$ and $S_2$ can be kept at a constant value, for example, from 0 to 1 volt, whatever may be the measurement range corresponding to the voltage to be measured at the input of the tripole, for example, 1 millivolt to 10 volts. As long as the galvanometer gives a reading which is between 0 and 100 percent of its scale, the same also applies as regards the recording unit on its respective scale.

Furthermore, the relatively high value of the voltage available at the terminals of the operational amplifier used according to the invention permits the use of a recording unit of relatively conventional construction in association with the tripole.

It is obvious that the present invention is not limited to the embodiments as described, but covers all variations thereof which are within the scope of the invention.

What is claimed is:

1. An electronic arrangement of the tripole type for converting impedances, said arrangement comprising:

a first, a second, and a third terminal a two-output symmetrical differential amplifier including first and second identical half-amplifiers having an input and an output, respectively, a common reference line, and respective supply lines each adjustably supplied with DC power from a DC power source connected to said common reference line, the inputs of the half-amplifiers being the differential inputs of said symmetrical differential amplifier, and the outputs of the half amplifiers being the two outputs of said symmetrical differential amplifier, respectively, each of said identical half-amplifiers providing an open loop gain of at least 1,000 with reversal of voltage polarity and including an input stage with high input impedance comprising a FET input transistor having a gate electrode connected to the input of the corresponding half-amplifier, a source electrode and a drain electrode connected via a resistor to the corresponding supply line, each of said half-amplifiers having at least a pair of first and second intermediate amplifying stages comprising transistors of complementary types with a DC coupling therebetween, and between the base electrode of the transistor of said first intermediate stage and the drain electrode of said FET input transistor, the source electrodes of the two FET input transistors having a common load to said reference line, the emitter electrodes of the respectively corresponding transistors in the first and second intermediate stages also having a common load to the reference and supply lines, respectively, the collector electrodes of the transistors in the second and first intermediate stages being connected via respective resistors to the reference line and corresponding supply line, respectively, each of said half-amplifiers having an output stage with low output impedance comprising at least a power transistor, the base of which is DC coupled to the collector electrode of the last transistor in said intermediate amplifying stages, the emitter of which is connected to a load impedance and is the output of the corresponding half-amplifier, a total negative feedback lead connecting the output to the input in said first half amplifier said first, second, and third terminals being connected to the input of said first half amplifier, the input of said second half amplifier, and the output of said second half-amplifier, respectively, whereby the apparent impedances between said first and second terminals and between said first and third terminals are both made extremely low, and the apparent impedance between said second and third terminal is made extremely high, wherever the second and third terminals are connected across a non-infinite impedance.

2. An arrangement according to claim 1, wherein each of said output stages of the half amplifiers is arranged to form a Darlington circuit.

3. An arrangement according to claim 1, comprising a resistor-capacitor series connection between the base and collector electrodes of the transistor in an intermediate stage of said first half-amplifier, and another resistor capacitor series connection between the collector of a transistor in an intermediate stage of said second half-amplifier, and the emitter of the transistor preceding the corresponding transistor in an intermediate stage of said first half amplifier.

4. An arrangement according to claim 1 wherein the common load from the source electrodes of the FET input transistors to the reference line is a constant current generator.

5. An arrangement according to claim 1, wherein each half amplifier comprises a series input resistor between its input and the gate electrode of the corresponding FET input transistor, and comprising an assembly of two diodes connected head-to-tail between the inputs of the half amplifiers.

6. An arrangement according to claim 5, comprising an adjustable constant current generator connected between the inputs of said half amplifiers.

7. An arrangement according to claim 1 comprising a Peltier effect refrigerating arrangement brought in thermal contact with each of said FET input transistors.

* * * * *